(12) United States Patent
Hasek

(10) Patent No.: US 10,547,885 B2
(45) Date of Patent: Jan. 28, 2020

(54) ADAPTIVELY SELECTING CONTENT RESOLUTION

(71) Applicant: Layer3 TV, Inc., Denver, CO (US)

(72) Inventor: Charles Hasek, Denver, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/001,691

(22) Filed: Jun. 6, 2018

(65) Prior Publication Data

US 2018/0359500 A1 Dec. 13, 2018

Related U.S. Application Data

(60) Provisional application No. 62/516,876, filed on Jun. 8, 2017.

(51) Int. Cl.
| | | |
|---|---|---|
| H04N 21/239 | (2011.01) | |
| H04N 21/2343 | (2011.01) | |
| H04N 21/258 | (2011.01) | |
| H04N 21/24 | (2011.01) | |
| H04N 21/84 | (2011.01) | |

(52) U.S. Cl.
CPC ... *H04N 21/2393* (2013.01); *H04N 21/23439* (2013.01); *H04N 21/2402* (2013.01); *H04N 21/25825* (2013.01); *H04N 21/25891* (2013.01); *H04N 21/84* (2013.01)

(58) Field of Classification Search
CPC ......... H04N 21/2393; H04N 21/23439; H04N 21/25891; H04N 21/84; H04N 21/44209; H04N 21/2662; H04N 21/6125; H04N 21/4621; H04N 21/2402; H04N 21/25825; H04N 21/4532; H04N 21/258; H04N 21/440218; H04N 21/6175; H04N 21/64738; H04L 65/80; H04L 47/38

USPC .......................................................... 725/116

See application file for complete search history.

(56) References Cited

U.S. PATENT DOCUMENTS

| | | | | |
|---|---|---|---|---|
| 8,473,630 | B1 * | 6/2013 | Galligan | H04N 21/2402 709/224 |
| 2006/0256376 | A1 * | 11/2006 | Hirooka | H04N 21/234363 358/1.15 |
| 2007/0127423 | A1 * | 6/2007 | Ho | H04W 8/18 370/338 |
| 2008/0052414 | A1 * | 2/2008 | Panigrahi | H04N 21/23439 709/246 |
| 2012/0105611 | A1 * | 5/2012 | Godar | H04N 13/122 348/54 |

(Continued)

Primary Examiner — Cynthia M Fogg
(74) Attorney, Agent, or Firm — Brownstein Hyatt Farber Schreck, LLP

(57) ABSTRACT

A content provider device adaptively selects content resolution. The content provider device receives a request for content and obtains resolution information for a device associated with the request from a profile. Based at least on the obtained resolution information, the content provider device selects among available resolution versions of the content and provides access to the selected version of the content. The resolution information may be derived from a High Definition Multimedia Interface handshake, such as from Extended Display Identification Data stored by the device, and recorded in the profile during a registration process identifying the device.

20 Claims, 9 Drawing Sheets

(56) References Cited

U.S. PATENT DOCUMENTS

| | | | |
|---|---|---|---|
| 2012/0113463 A1* | 5/2012 | Nogawa | H04N 1/0023 358/1.15 |
| 2012/0236159 A1* | 9/2012 | Tamura | H04N 1/00164 348/207.1 |
| 2012/0331106 A1* | 12/2012 | Ramamurthy | H04N 21/234327 709/218 |
| 2013/0174238 A1* | 7/2013 | Wang | H04N 21/25816 726/7 |
| 2014/0026160 A1* | 1/2014 | Shrum, Jr. | H04N 21/25841 725/25 |
| 2014/0164529 A1* | 6/2014 | Kleppmann | H04L 51/066 709/206 |
| 2014/0207907 A1* | 7/2014 | Wang | H04L 65/602 709/217 |
| 2015/0074232 A1* | 3/2015 | Phillips | H04L 65/604 709/219 |
| 2015/0149614 A1* | 5/2015 | Sinha | H04W 8/18 709/224 |
| 2016/0119404 A1* | 4/2016 | Bowen | G06Q 10/0631 709/217 |

* cited by examiner

ADAPTIVELY SELECTING CONTENT RESOLUTION

CROSS-REFERENCE TO RELATED APPLICATION(S)

This application is a nonprovisional patent application of and claims the benefit of U.S. Provisional Patent Application No. 62/516,876, filed Jun. 8, 2017 and titled "Adaptively Selecting Content Resolution," the disclosure of which is hereby incorporated by reference herein in its entirety.

FIELD

The described embodiments relate generally to adaptively selecting content resolution. More particularly, the present embodiments relate to selecting among available content resolution based on resolution information in a profile for a device requesting the content.

BACKGROUND

Content providers, such as cable or satellite television providers, may provide content to users. This content may be television programs, movies, broadcast content, on demand content, music, audio, video, and/or any other content.

Content involving audio, video, images, or the like may have a resolution. Content access devices such as set top boxes, computing devices, televisions, and so on, may be operable to present content at some resolutions but may present content at other resolutions improperly or not at all.

Some content providers may be able to provide multiple different versions of content. The different versions may have different resolutions.

SUMMARY

The present disclosure relates to adaptively selecting content resolution. A content provider device receives a request for content and obtains resolution information for a device associated with the request from a profile. Based at least on the obtained resolution information, the content provider device selects among available resolution versions of the content in order to provide the highest resolution version that the device can utilize. The content provider device then provides access to the selected version of the content.

In various implementations, an electronic device for adaptively selecting content resolution may include a non-transitory storage medium and a processing unit. The processing unit executes instructions stored in the non-transitory storage medium to receive a request for content, obtain resolution information from a user profile that corresponds to a device associated with the request, select a version of the content from available versions that has a highest resolution enabled by a current network condition and is within constraints indicated in the resolution information, and provide access to the version of the content.

In some examples, the processing unit determines an additional version of the content has a higher resolution enabled by the current network condition and is within the constraints indicated in the resolution information, ceases providing access to the version of the content, and provides access to the additional version of the content. In numerous examples, the processing unit determines the version of the content is no longer enabled by the current network condition, determines an additional version of the content that is enabled by the current network condition and is within the constraints indicated in the resolution information, ceases providing access to the version of the content, and provides access to the additional version of the content.

In various examples, the processing unit monitors the current network condition for changes. In some examples, the user profile is unique to a particular user.

In numerous examples, the device is a presentation device associated with a content access device that provided the request for the content. In such examples, the content access device may be operable to automatically switch between different versions of the content when the different versions of the content are provided by the processing unit.

In some implementations, an electronic device for adaptively selecting content resolution includes a non-transitory storage medium and a processing unit. The processing unit executes instructions stored in the non-transitory storage medium to receive a content request for a device, obtain resolution information for the device from a registration file, select a content resolution based on the resolution information, and provide access to a version of content having the content resolution.

In various examples, the processing unit stores the resolution information in the registration file upon receipt during a registration process. In some instances of such examples, the processing unit may receive an identifier for the device along with the resolution information. In various instances of such examples, the resolution information may be derived from a High Definition Multimedia Interface handshake. In numerous instances of such examples, the resolution information may be derived from Extended Display Identification Data stored by the device.

In some examples, the device is operable to automatically switch between different versions of the content when the different versions of the content are provided by the processing unit. In various examples, the registration file is shared between users of a content provider device service.

In numerous implementations, an electronic device for adaptively selecting content resolution includes a non-transitory storage medium and a processing unit. The processing unit executes instructions stored in the non-transitory storage medium to obtain resolution information from a user profile that corresponds to a device associated with a content request and select a version of content to which to provide access that has a resolution in accordance with the resolution information.

In various examples, the non-transitory storage medium stores an additional version of the content that has a higher resolution than the version of the content and is incompatible with the device. In some examples, the processing unit stores the resolution information in the user profile during a registration process that includes receiving an identifier for the device and querying for the resolution information using the identifier.

In numerous examples, the device is a content access device that submitted the content request. In various examples, the device is a television upon which a set top box that submitted the content request is operable to display content. In some examples, the processing unit receives the content request from the device.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
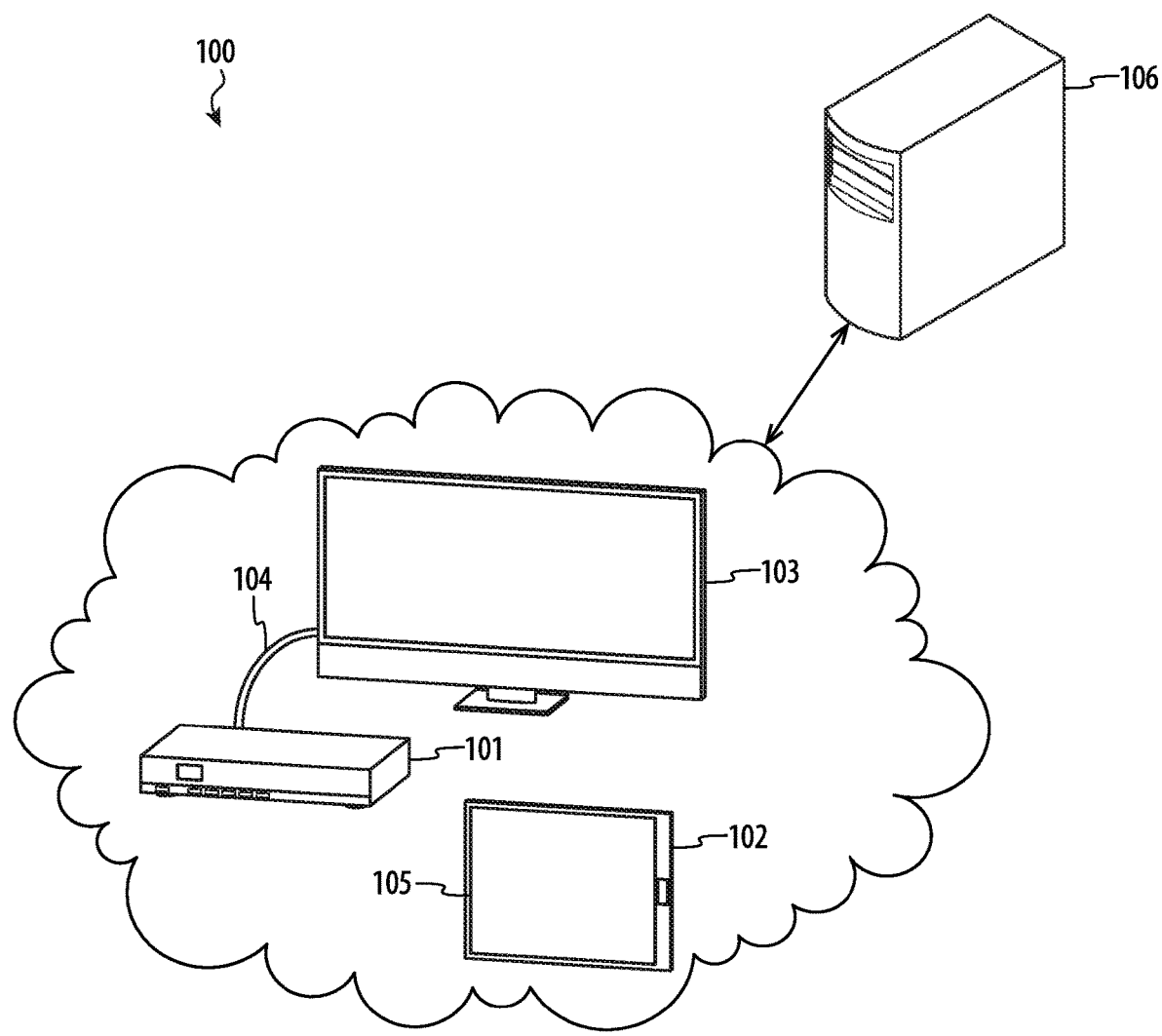
FIG. 1 depicts a system for adaptively selecting content resolution.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

The present disclosure relates to adaptively selecting content resolution. A content provider device may receive a request for content and obtain resolution information for a device associated with the request from a profile. Based at least on the obtained resolution information, the content provider device may select among available resolution versions of the content. The content provider device then provides access to the selected version of the content.

In some implementations, the content provider device may select the highest resolution version of the content available that is enabled by a current network condition and compatible with the device. For example, current network conditions may be network bandwidth limitations. When network bandwidth does not enable efficient transmission of a higher resolution version of the content, a lower resolution version that is enabled by the network bandwidth may be used instead. The version may be switched when network bandwidth limitations change. Current network conditions may be other limitations in other examples, such as storage server loads, user subscription limitations, and so on.

In various implementations, the resolution information for the device may be stored in the profile by registering the device. For example, users may register each of the devices used with their content provider account. This registration may involve identifying each content access device and/or related presentation device they use, indicating and/or otherwise allowing the content provider to determine resolution information for the devices, and so on. This information may then be stored in a user profile.

In some examples, the resolution information may be derived from a procedure such as a High Definition Multimedia Interface (HDMI) handshake. The HDMI handshake is a process by which devices connected by HDMI establish a connection in order to communicate. The HDMI handshake is typically performed when the connected devices power on and typically involves exchange of the Extended Display Identification Data (EDID) of the devices in order to establish appropriate resolution, Digital Rights Management (DRM), and so on. The resolution information exchanged as part of the HDMI handshake may be used in registering one or more of the connected devices.

These and other embodiments are discussed below with reference to FIGS. 1-9. However, those skilled in the art will readily appreciate that the detailed description given herein with respect to these Figures is for explanatory purposes only and should not be construed as limiting.

In various embodiments, the present disclosure may relate to a set top box device, system, and process using HDMI handshake and the Extended Display Identification Data EDIDs to provide adaptively real-time selection of screen resolutions available for media content to display to the subscriber.

High Definition Multimedia Interface (HDMI) may be an "all-in-one-cable" way to connect high-definition (HD) audio-visual (AV) components and may be used with Blu-ray™ players, AV receivers, cable/satellite set top boxes, gaming consoles, and video displays such as plasma, LCD (liquid crystal diode), and/or LED (light emitting diode) TVs (televisions) and front projectors. HDMI may pass high-definition video (HD-video) and high-resolution, multichannel audio (including the DTS Master Audio and Dolby True HD soundtracks found on many Blu-ray discs) over a single cable. This may provide an easy, uncluttered way to connect AV devices. At startup, the device and display may exchange an HDMI protocol to establish the screen resolution, also referred to as the HDMI handshake.

In many systems, the HDMI handshake may employ a request between the set top box, computing device, or other device and the display in order to establish the appropriate resolution utilizing the display's EDID, such as from a chipset of the monitor, as part of the HDMI authentication/HDMI handshake. Connected devices may perform the HDMI handshake in order to transmit signals. For example, in a cable system, the HDMI handshake of a cable set top box and a High-Definition TV (HD TV) may occur at power up. Among other things, the initial HDMI handshake between the set top box and the HD TV may establish the appropriate screen resolution of the monitor or display device. If the handshake is unsuccessful, the viewer may see a blue screen, snow, or otherwise corrupted image on the screen.

Problems may still occur using HDMI connections between cable/satellite set top boxes and the display. For example, the HDMI handshake can fail during playback of media content setting a less than optimal resolution. In many systems, the set top box may initially perform a handshake to determine the HDMI resolution, which may be set upon energizing the set top box and the digital monitor. Once the resolution is set to a resolution, such as 720p 60, the set top box may maintain that resolution. Set top boxes that operate in this manner have disadvantages as the user may need to provide input for change and/or additional settings and permissions to change the resolution. In other words, they are not adaptive. For example, should the content equally be available in a higher resolution, such as 8490p 30, the original resolution would continue to be provided to the monitor or display. In order to re-establish the highest resolution, the user may need to disconnect and reconnect the HDMI cable at each end and/or power down the components and restart as the HDMI handshake between two devices may be configured at the onset of the connection.

Moreover, subscriber based content delivery networks (CDN) (i.e., cable TV, satellite TV and other content providers) may use unicast broadcasting. This CDN may stream one resolution to the set top box of the subscriber. Other problems exist in that the set top box of the subscriber may need to be enabled for adaptive streaming (i.e., to adjust the resolution up or down) for the media content so as to be dynamically changed by or for the subscriber. Finally, some set top box systems and hardware may not be capable of determining monitor or other screen resolutions and may not provide the media content in the highest resolution available. However, systems, apparatuses, and methods in accordance with the present disclosure may dynamically provide the highest resolution to the subscriber or user.

Systems, apparatus, and methods of the present disclosure may dynamically provide a best resolution for viewing the media content based on the device of the subscriber. A profile of a home system may be provided and the best resolution from the profile may be provided using a catalog of the resolutions of all equipment recognized within the subscriber's account (e.g., VOD, recorded, DVR, etc.). The resolution of the content may be changed adaptively and in real-time, quickly and transparently in providing the best resolution for the device, house and/or subscriber. The present disclosure may also provide a system, apparatus, and method of identifying subscriber's profile information for registered devices so as to provide best for the house resolutions for playback of the video stream in an efficient and cost effective manner.

Non-limiting embodiments of the present invention will be described below with reference to the accompanying drawings, wherein like reference numerals represent like elements throughout. While the disclosure has been described in detail with respect to the preferred embodiments thereof, it will be appreciated that upon reading and understanding of the foregoing, certain variations to the preferred embodiments will become apparent, which variations are nonetheless within the spirit and scope of the disclosure.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "Extended Display Identification Data" or "EDID" may refer to a standardized means and/or data structure for a display to communicate its capabilities to a source device, whereby in a digital display the EDID may be provided as data structure of the digital display to describe its capabilities to a video source.

As used herein the term "High-definition television" or "HDTV" may refer to a resolution that is substantially higher than that of standard-definition television. HDTV may be transmitted in various formats: 1080p-1920×1080p: 2,073,600 pixels (~2.07 megapixels [Mpx]) per frame; 1080i (generally either: 1920×1080i: 1,036,800 pixels (~1.04 Mpx) per field or 2,073,600 pixels (~2.07 Mpx) per frame or 14400×1080i: 777,600 pixels (~0.78 Mpx) per field or 1,555,200 pixels (~1.56 Mpx) per frame); 720p-1280× 720p: 921,600 pixels (~0.92 Mpx) per frame; and so on. The letter "p" here stands for progressive scan while "i" indicates interlaced. When transmitted at two megapixels per frame, HDTV provides about five times as many pixels as SD (standard-definition television).

As used herein the "HLS" or "HTTP Live Streaming" may refer to an HTTP-based media streaming communications protocol. As used herein "HTTP" or "HyperText Transfer Protocol" may refer to a communications protocol used to connect to Web servers on the Internet or on a local network (intranet), whereby multiple files could be downloaded with the same connection. The primary function of HTTP may be to establish a connection with the server and send HTML pages back to the user's browser. HTTP also may be used to download files from the server either to the browser or to any other requesting application that uses HTTP. HTTP may be a "stateless" request/response system whereby a connection is maintained between client and server only for the immediate request, and the connection is closed after the HTTP client establishes a TCP connection with the server and sends it a request command, the server sends back its response and closes the connection.

As used herein "HDMI" may refer to High Definition Multimedia Interface (HDMI) standard specification developed as the all-digital interface standard for the consumer electronics and personal computer markets. The HDMI specification combines uncompressed high-definition video, multi-channel audio, and data in a single digital interface to provide crystal-clear digital quality over a single cable.

As used herein "HDMI handshake" or "HDMI authentication" may refer to High Definition Multimedia Interface (HDMI) handshake and the Extended Display Identification Data (EDIDs) to adaptively select optimum screen resolution for recording and streaming the displaying content to the subscriber.

As used herein the term "clean HDMI" or "uncompressed video" may refer to digital video information that has not been compressed, or not processed with compression when the video was captured directly via video capture, e.g., from a digital stream, digital camera, the related data stream or the file format used in the video capture process and significantly higher quality video compared to loss compression.

As used herein the term "digital audio" may refer to audio signals in digital format. Specifically, "HDMI Digital Audio" may refer to audio signals in a supported HDMI device which audio is in a baseline format including stereo (uncompressed) PCM.

As used herein the term "Return" may refer to the case where the audio comes from the TV and can be sent "upstream" to the AV receiver using the HDMI cable connected to the AV receiver. An example given on the HDMI website is that a TV that directly receives a terrestrial/satellite broadcast, or has a video source built in, sends the audio "upstream" to the AV receiver.

As used herein the term "Unicast" may refer to a one-to-one relationship between the server and the clients receiving the stream. This model may cause problems when content is popular and the media server does not have enough bandwidth to support all of the client connections. Unicast may be well suited to deliver media, content and/or video on-demand. Unicast may have disadvantages in the synchronization of live content.

As used herein the term "content" or "media content" may refer to sound text and images in a tangible medium such as frames of television, motion picture, audio, books, magazines, live events, text, tweets, such as conferences and stage performances, information and experiences that provides value for a user.

As used herein the term "encoder" may refer to content files and/or streams (linear or VOD stream) into a predetermined displayable format. Encoding can encode the content transforming from one source format to one or more other output formats, e.g., taking an HBO stream (MPEG-2, 4, AVC) to another format such as HEVC AVC or both at the same time in these various formats. Encoding of a linear or VOD stream may be needed to reduce the size of the source feed (satellite, fiber, direct linear source, Internet Protocol—IP, and VOD), e.g., reducing 1.2 GB to 600 Mbps. Encoding also is useful to ingest the original content and convert to various standard encoding algorithms and formats for video, audio and other content, e.g., JPEG 2K standard, AVC-I and for a particular display (i.e. size and resolution).

As used herein the term "resource manager" may refer to system hardware and software to provide the function of persistence and rights policy function concerning or regarding the content including interfacing the catalog, managing the rules around the content, mapping the content to clients and/or the associated server cache tier(s) and the digital rights management (DRM) in the IPDN system.

As used herein the term "device" and/or "monitor" may refer to any device for viewing content including tablet computing devices, mobile computing devices, wearable devices, smart phones, cellular telephones, computing devices, set top boxes, displays, TVs, and the like.

As used herein the term "Digital Rights Management" or "DRM" may refer to software and/or hardware in the system utilized to control the use and viewing of digital content according to various rights and policies concerning or regarding the content as outlined by the content owner according to the sale or license thereof.

As used herein the term "linear" "linear TV" or "traditional television" may refer to content or television service where the viewer has to watch a scheduled TV program at the particular time it's offered, and on the particular channel it's presented on.

As used herein the term "non-linear", "video on demand" or "VOD" may refer to an advanced, non-traditional way of presenting television, content and live broadcast programming and, in many ways, the opposite of linear TV including editing and storage of audio, video and other data, whereby content and data can be brought up from the media (e.g., a CD, computer disk, digital video recorders (DVRs), video cassette recorders (VCRs)) without having to know physically where it was entered onto that medium.

As used herein the term "rights" may refer to digital terms for the copying and use of copyrightable content. Currently two rights expression languages in use are the MPEG Right Expression Language (MPEG REL) and the Open Digital Rights Language (ODRL), both XML-based computer languages. ODRL utilizes rights terminology like "excerpt," "install," "lend," "modify," "play" and "sell." It also sets forth constraints ("fixed amount," "interval" and "range") and defines payments ("feeType," "prepay" and "postpay").

FIG. 1 depicts a system 100 for adaptively selecting content resolution. The system 100 may include one or more content provider devices 106 that are operable to communicate with one or more content access devices 101, 102. One or more of the content access devices 101, 102 may request content from the content provider device 106. The content provider device 106 may have multiple versions of the requested content available. Those versions may have different resolutions. The content provider device 106 may obtain resolution information from a user profile (or other profile, registration file, and so on) that corresponds to a device associated with the request and select a version of content to which to provide access that has a resolution in accordance with the resolution information.

For example, a television 103 may be a device associated with a content request submitted by the content access device 101 because the content access device 101 is operable to present content on the television 103 via a HDMI cable 104. Similarly, a screen 105 incorporated into the content access device 102 may be a device associated with a content request submitted by the content access device 102 because the content access device 102 is operable to present content on the screen 105.

In various implementations, the content provider device 106 may attempt to provide the highest resolution version of the requested content that is possible. This may be because the highest resolution version may have the highest quality. However, the device associated with the request may not be compatible with that resolution and a lower resolution version may therefore be selected. Further, various current network conditions may not enable transmission at the highest resolution and a lower resolution version may therefore be selected.

Current network conditions may involve network bandwidth, processor load, storage load, and/or any other aspect of the system 100 that may influence whether or not access to a content of a particular resolution can be provided at a particular time without adversely affecting presentation. For example, if network bandwidth is too congested to allow access to content of a particular resolution, access to a lower bandwidth version may be provided instead even if the device associated with the request could present higher resolution versions. By way of another example, if the current processing load of a processing unit of the requesting content access device 101, 102 cannot currently handle content of a particular resolution, access to a lower bandwidth version may be provided instead even if the device associated with the request is otherwise capable of presenting higher resolution versions. By way of another example, if content provider device 106 is experiencing too many requests in order to provide access to a particular resolution version of content, access to a lower bandwidth version may be provided instead even if the device associated with the request could present higher resolution versions.

In various implementations, the content provider device 106 may change the version of the content that is provided. For example, if the content provider device 106 provided access to a lower resolution version of the content than was possible due to current network conditions, the content provider device 106 may monitor the current network conditions and switch to providing access to a higher resolution version of the content when possible. The content provider device 106 may monitor current network conditions over time and may alter the resolution version of the content to which access is provided accordingly, such as by attempting to provide the highest resolution version at any given time that a device associated with the request can accommodate. The content access device 101, 102 may automatically present whatever version of the content is currently being provided via the associated device without requiring user intervention or input for any resolution changes.

In some implementations, one or more users may register one or more content access devices 101, 102 and/or associated devices, such as the television 103, the screen 105, and so on, with the content provider device 106. This registration may involve submitting one or more identifiers for the associated device, the resolution information, and so on. Any information submitted as part of registration may be recorded in the user profile.

In various examples, the resolution information may be derived from a HDMI handshake. For example, the content access device 101 may be connected to the television 103 by a HDMI cable. A HDMI handshake may be performed before the connection can be used, such as when one or more of the content access device 101 and/or the television 103 are powered on. This HDMI handshake may involve exchange of EDID stored by the content access device 101 and/or the television 103. This EDID may specify the resolution information, which may include one or more resolutions, resolution ranges, maximum resolutions, or other resolution information regarding the capabilities and/or compatibilities of the respective device.

For example, the content access device 101 may obtain the EDID of the television 103 when performing the HDMI handshake with the television 103. The content access device 101 may then be involved in a registration process where the television 103 is registered to the user profile. The content access device 101 may provide an identifier for the television 103. Because the content access device 101 obtained the EDID of the television 103 from the HDMI handshake, the content access device 101 may provide the EDID of the television 103 as part of the registration.

In other examples, the content provider device 106 may not receive the resolution information from the user as part of the registration process. Many associated devices have known capabilities, or capabilities that are readily ascertainable. As such, the content provider device 106 may receive an identification of the associated device to register and then may query a database or other information source where resolution information for various devices can be found using the identification. This may allow the content provider device 106 to be able to identify resolutions that are within the constraints of the associated device and record such in the user profile without burdening the user and/or the content access device the user uses to register the content access device and/or the associated device.

In some implementations, the user profile may be unique to a particular user account. As such, only resolution information for devices registered to one or more users associated with the user account may be included. However, such an implementation may create a lot of duplicate information stored for similar devices. As such, other implementations may share a profile between multiple users. Such a shared profile may include resolution information for devices registered to multiple different users and/or user accounts.

Although FIG. 1 is illustrated that the content access device 101 is a set top box connected to a television 103 by a HDMI cable 104 and the content access device 102 is a tablet computing device with an integrated screen 105, it is understood that these are examples. In various implementations, the techniques of the present disclosure may be performed using any content access device capable of interacting with the content provider device 106 to request and/or obtain content to present. Such content access devices may include, but are not limited to, set top boxes, laptop computing devices, smart phones, digital media players, televisions, wearable devices, desktop computing devices, mobile computing devices, tablet computing devices, cellular telephones, and so on.

Figure 2:
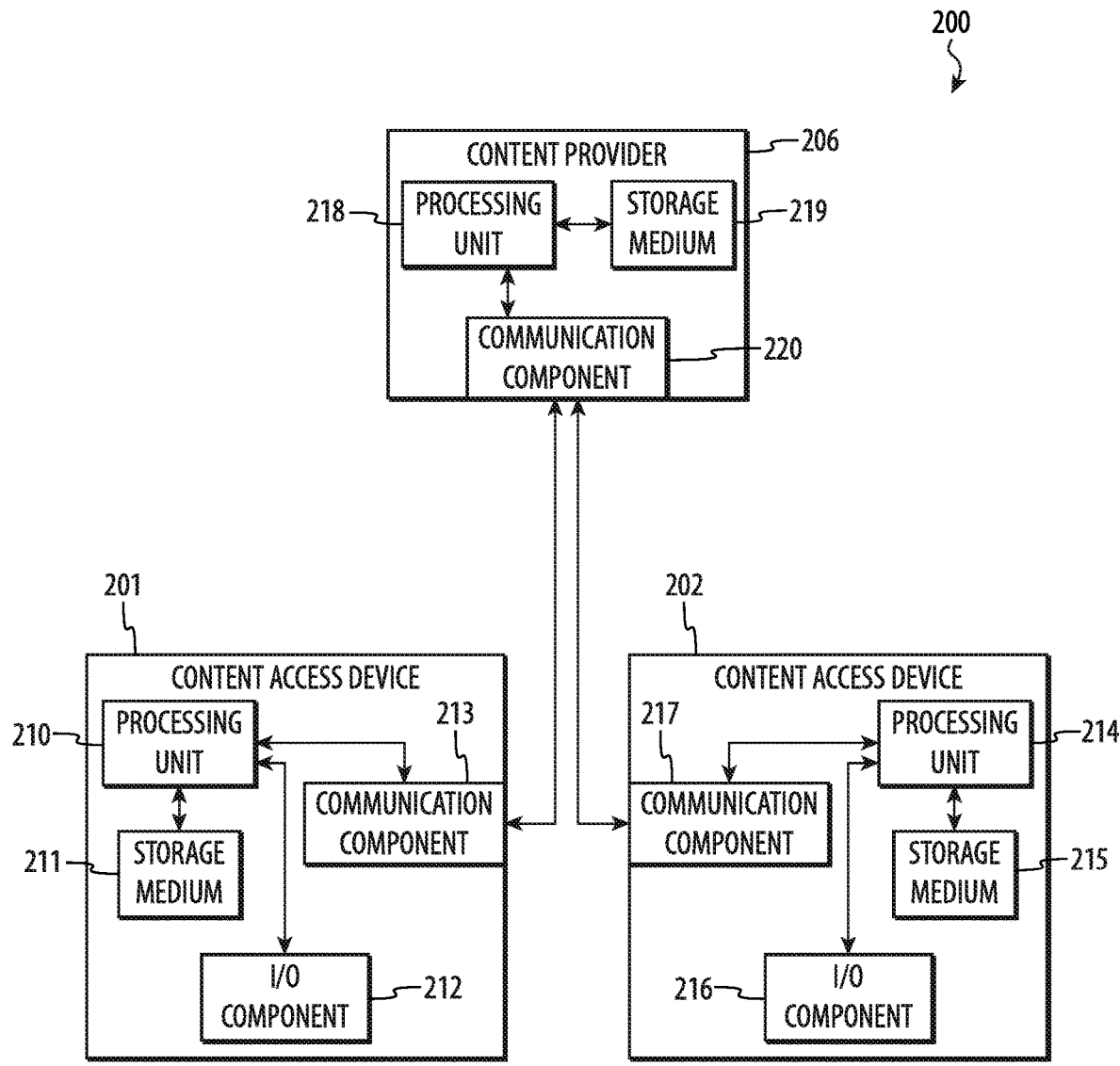
FIG. 2 depicts a block diagram illustrating components and relationships in an example system. The example system may be an implementation of the system of FIG. 1.

FIG. 2 depicts a block diagram illustrating components and relationships in an example system 200. The example system may be an implementation of the system 100 of FIG. 1. The system 200 may include one or more content provider devices 206 that are operable to communicate with one or more content access devices 201, 202.

The content access device 201 may include one or more processing units 210, non-transitory storage media 211 (which may take the form of, but is not limited to, a magnetic storage medium; optical storage medium; magneto-optical storage medium; read only memory; random access memory; erasable programmable memory; flash memory; and so on), I/O components 212 (such as interfaces to one or more associated devices like the television 103 or the screen 105 of FIG. 1), communication components 213, and so on. Similarly, the content access device 202 may include one or more processing units 214, non-transitory storage media 215, I/O components 216, communication components 217, and so on. Likewise, the content provider device 206 may include one or more processing units 218, non-transitory storage media 219, communication components 220, and so on. The content access devices 201, 202 and/or the content provider device 206 may utilize various components to perform various functions. Such functions may include functions described above with respect to similar devices in FIG. 1.

In some implementations, the processing unit 218 of the content provider device 206 may execute instructions stored in the non-transitory storage medium 219 to perform a first method of adaptively selecting content resolution. The processing unit 218 may receive a request for content, obtain resolution information from a user profile that corresponds to a device associated with the request, select a version of the content from available versions that has a highest resolution enabled by a current network condition and is within constraints indicated in the resolution information, and provide access to the version of the content.

In various examples, the processing unit may also determine an additional version of the content has a higher resolution enabled by the current network condition and is within the constraints indicated in the resolution information, cease providing access to the version of the content, and provide access to the additional version of the content. In some examples, the processing unit may also determine the version of the content is no longer enabled by the current network condition, determine an additional version of the content that is enabled by the current network condition and is within the constraints indicated in the resolution information, cease providing access to the version of the content, and provide access to the additional version of the content.

In numerous examples, the processing unit may monitor the current network condition for changes. In various examples, the user profile may be unique to a particular user. In various examples, the device may be a presentation device associated with a content access device that provided the request for the content. In such examples, the content access device may be operable to automatically switch between different versions of the content when the different versions of the content are provided by the processing unit.

In various implementations, the processing unit 218 of the content provider device 206 may execute instructions stored in the non-transitory storage medium 219 to perform a second method of adaptively selecting content resolution. The processing unit 218 may receive a content request for a device, obtain resolution information for the device from a registration file, select a content resolution based on the resolution information, and provide access to a version of content having the content resolution.

In some implementations, the processing unit may store the resolution information in the registration file upon receipt during a registration process. In some cases of such examples, the processing unit may receive an identifier for the device along with the resolution information. In various cases of such examples, the resolution information may be derived from a High Definition Multimedia Interface handshake. In numerous cases of such examples, the resolution information may be derived from Extended Display Identification Data stored by the device.

In various implementations, the device may be operable to automatically switch between different versions of the content when the different versions of the content are provided by the processing unit. In some implementations, the registration file may be shared between users of a content provider device service.

In numerous implementations, the processing unit 218 of the content provider device 206 may execute instructions stored in the non-transitory storage medium 219 to perform a third method of adaptively selecting content resolution. The processing unit 218 may obtain resolution information from a user profile that corresponds to a device associated with a content request and select a version of content to which to provide access that has a resolution in accordance with the resolution information.

In various implementations, the non-transitory storage medium may store an additional version of the content that has a higher resolution than the version of the content and is incompatible with the device. In some implementations, the processing unit may store the resolution information in the user profile during a registration process that includes receiving an identifier for the device and querying for the resolution information using the identifier.

In numerous implementations, the device may be a content access device that submitted the content request. In various implementations, the device may be a television upon which a set top box that submitted the content request is operable to display content. In numerous implementations, the processing unit may receive the content request from the device.

Figure 3:
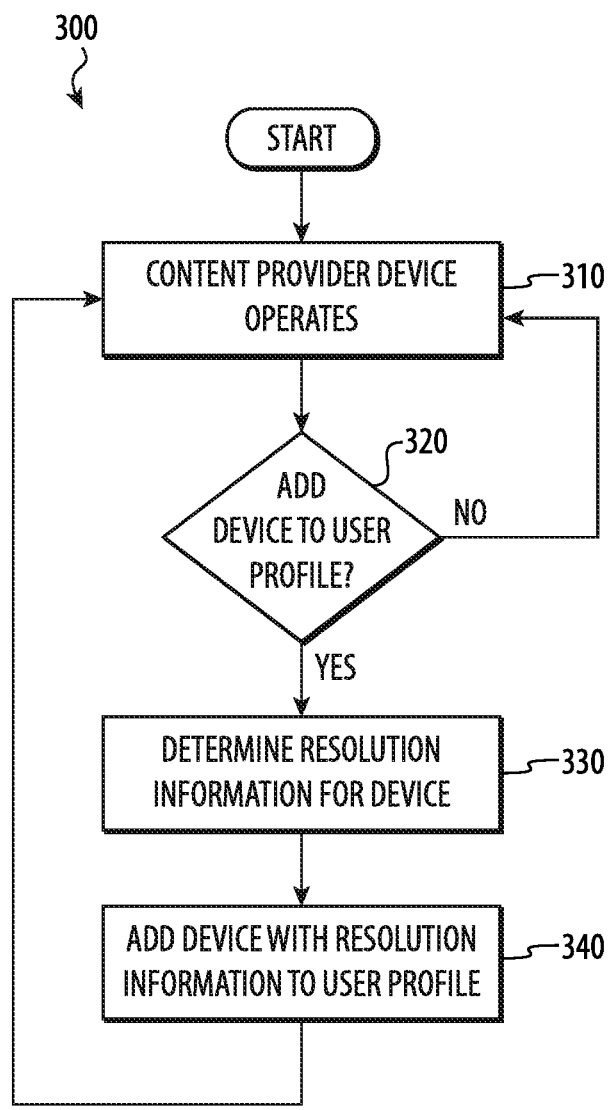
FIG. 3 depicts a flow chart illustrating an example method for registering a device in a system for adaptively selecting content resolution. The method may be performed by the system of FIG. 1 and/or the system of FIG. 2.

FIG. 3 depicts a flow chart illustrating an example method 300 for registering a device in a system for adaptively selecting content resolution. The method 300 may be performed by the system 100 of FIG. 1 and/or the system 200 of FIG. 2.

At 310, a content provider device operates. The flow then proceeds to 320 where the content provider device determines whether or not to add a device to a user profile. The content provider device may make the decision in response to a communication from a content access device. The device to add may be the content access device, an associated device such as a television, and so on. If so, the flow proceeds to 330. Otherwise, the flow returns to 310 where the content provider device continues to operate.

At 330, the content provider device determines the resolution information for the device. The content provider device may determine the resolution information by receiving it from the content access device (such as resolution information the content access device received as part of a HDMI handshake, EDID information stored by the content access device or the associated device, and so on). The content provider device may also receive an identifier for the device. Alternatively, the content provider device may receive an identifier for the device and then determine the resolution information itself based on the identifier.

The flow then proceeds to 340 where the content provider device adds the device with the resolution information to the user profile. The flow then returns to 310 where the content provider device continues to operate.

Although the example method 300 is illustrated and described as including particular operations performed in a particular order, it is understood that this is an example. In various implementations, various orders of the same, similar, and/or different operations may be performed without departing from the scope of the present disclosure.

For example, 320 is illustrated and described as adding the device to the user profile. However, it is understood that this is an example. In some implementations, the device may already be listed in the user profile and the example method 300 may be used to update the resolution information, identifier, and/or other stored information. Various configurations are possible and contemplated.

Figure 4:
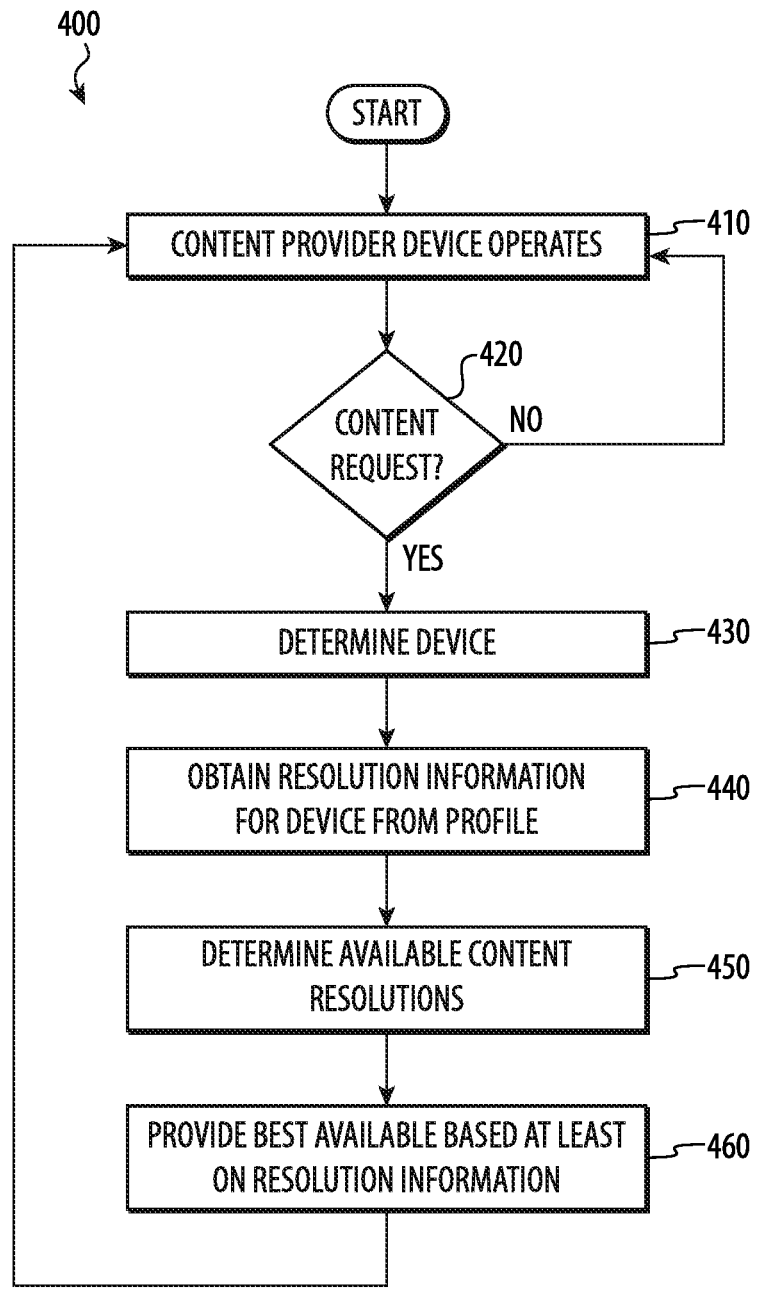
FIG. 4 depicts a flow chart illustrating a first example method for adaptively selecting content resolution. The method may be performed by the system of FIG. 1 and/or the system of FIG. 2.

FIG. 4 depicts a flow chart illustrating a first example method 400 for adaptively selecting content resolution. The method 400 may be performed by the system 100 of FIG. 1 and/or the system 200 of FIG. 2.

At 410, a content provider device operates. The flow then proceeds to 420 where the content provider device determines whether or not a content request is received. If so, the flow proceeds to 430. Otherwise, the flow returns to 410 where the content provider device continues to operate.

At 430, the content provider device may determine a device associated with the content request. The flow then proceeds to 440 where the content provider device obtains resolution information for the device from a profile or registration file. Next, the flow proceeds to 450 where the content provider device determines available resolution versions of the content.

The flow then proceeds to 460 where the content provider device provides the best available resolution version of the content (such as highest resolution version that is within constraints specified in the resolution information) based at least on the resolution information. Next, the flow returns to 410 where the content provider device continues to operate.

Although the example method 400 is illustrated and described as including particular operations performed in a particular order, it is understood that this is an example. In various implementations, various orders of the same, similar, and/or different operations may be performed without departing from the scope of the present disclosure.

For example, the example method 400 is illustrated and described as selecting a single resolution version of the content and then providing such. However, in various implementations, the content provider device may select to provide a first version of the content having a first resolution and then select to provide one or more second versions of the content having one or more second resolutions.

For example, the content provider device may select a highest resolution version of content to provide based on the resolution information and one or more current network conditions. The content provider device may then provide the selected version and monitor network conditions. When the network conditions degrade, the content provider device may select a lower resolution version of the content and provide that lower resolution version instead of the previously selected version. Similarly, when the network conditions degrade, the content provider device may select a higher resolution version of the content and provide that higher resolution version instead of the previously selected version. The content provider device may switch content versions any number of times. All selected versions may be in accordance with the resolution information.

Figure 5:
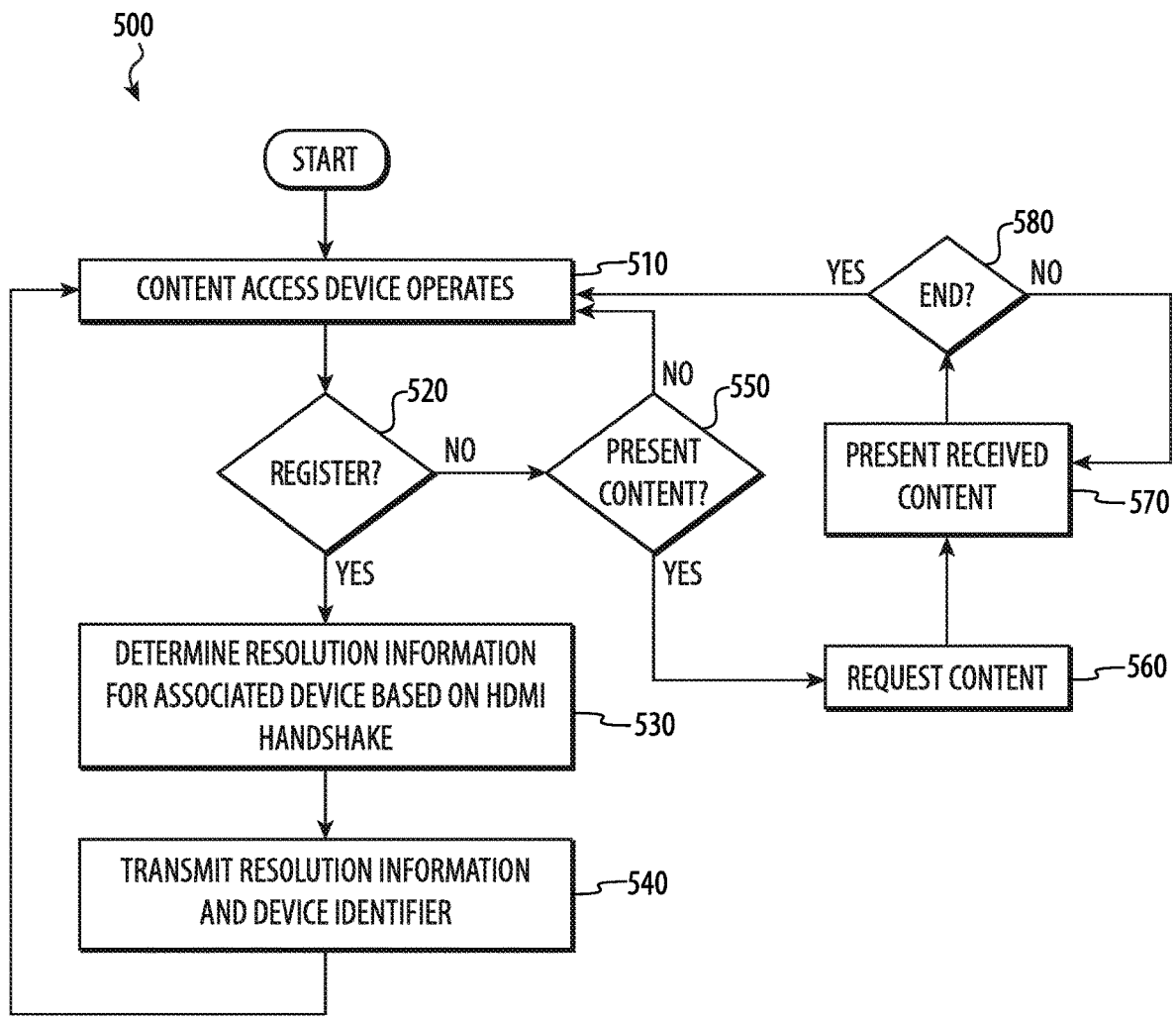
FIG. 5 depicts a flow chart illustrating a second example method for adaptively selecting content resolution. The method may be performed by the system of FIG. 1 and/or the system of FIG. 2.

FIG. 5 depicts a flow chart illustrating a second example method 500 for adaptively selecting content resolution. The method 500 may be performed by the system 100 of FIG. 1 and/or the system 200 of FIG. 2.

At 510, a content access device operates. The flow then proceeds to 520 where the content access device determines whether or to register an associated device. The content access device may make such a determination based on user input, use of the content access device with an associated device previously unused with a content provider, and so on. If so, the flow proceeds to 530. Otherwise, the flow may proceed to 550.

At 530, after the content access device determines to register an associated device, the content access device determines resolution information for the associated device based on a HDMI handshake that has been performed. The flow then proceeds to 540 where the content access device transmits the resolution information and an identifier for the associated device (such as a serial number, media access control address, or other identifier) to a content provider device for recordation in a profile. The flow then returns to 510 where the content access device continues to operate.

At 550, after the content access device determines not to register an associated device, the content access device determines whether or not to present content. The content access device may make such a determination based on receipt of user input indicating a content selection, triggering of an instruction to record and/or present content, and so on. If so, the flow proceeds to 560. Otherwise, the flow returns to 510 where the content access device continues to operate.

At 560, the content access device requests content. The flow then proceeds to 570 where the content access device presents the content received in response to the request. The content access device may present the content on the associated device, such as a television, an integrated screen, and so on. Next, the flow proceeds to 580 where the content access device determines whether or not to cease presenting content. If not, the flow returns to 570 where the content access device continues presenting the content. Otherwise, the flow returns to 510 where the content access device continues to operate.

Although the example method 500 is illustrated and described as including particular operations performed in a particular order, it is understood that this is an example. In various implementations, various orders of the same, similar, and/or different operations may be performed without departing from the scope of the present disclosure.

For example, the example method 500 is illustrated and described as determining whether or not to register an associated device and present content as separate, linearly performed operations. However, it is understood that this is an example. In various implementations, such operations may be performed simultaneously and/or in various orders without departing from the scope of the present disclosure.

By way of another example, the example method 500 is illustrated and described as requesting and presenting content. However, in various implementations, various different resolution versions of the requested content may be provided to the content access device at different times. In such implementations, the content access device may continue presenting the received content regardless of any resolution version changes that occur in the content being received and/or presented.

Figure 6:
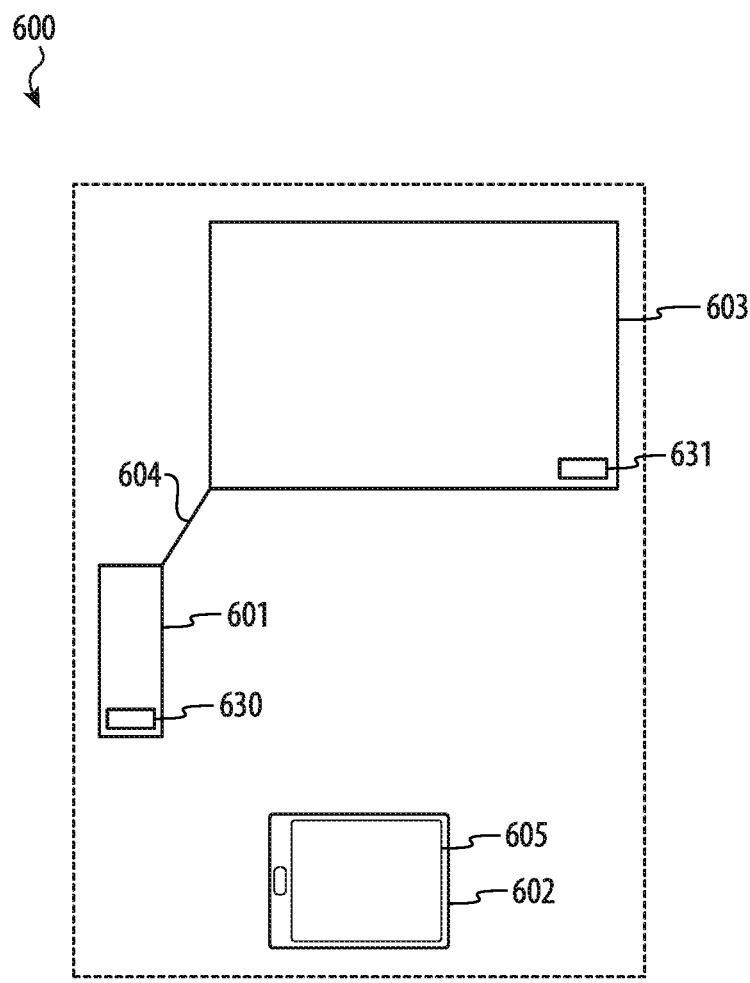
FIG. 6 depicts a block diagram illustrating a HDMI adaptive resolution system.
Figure 7:
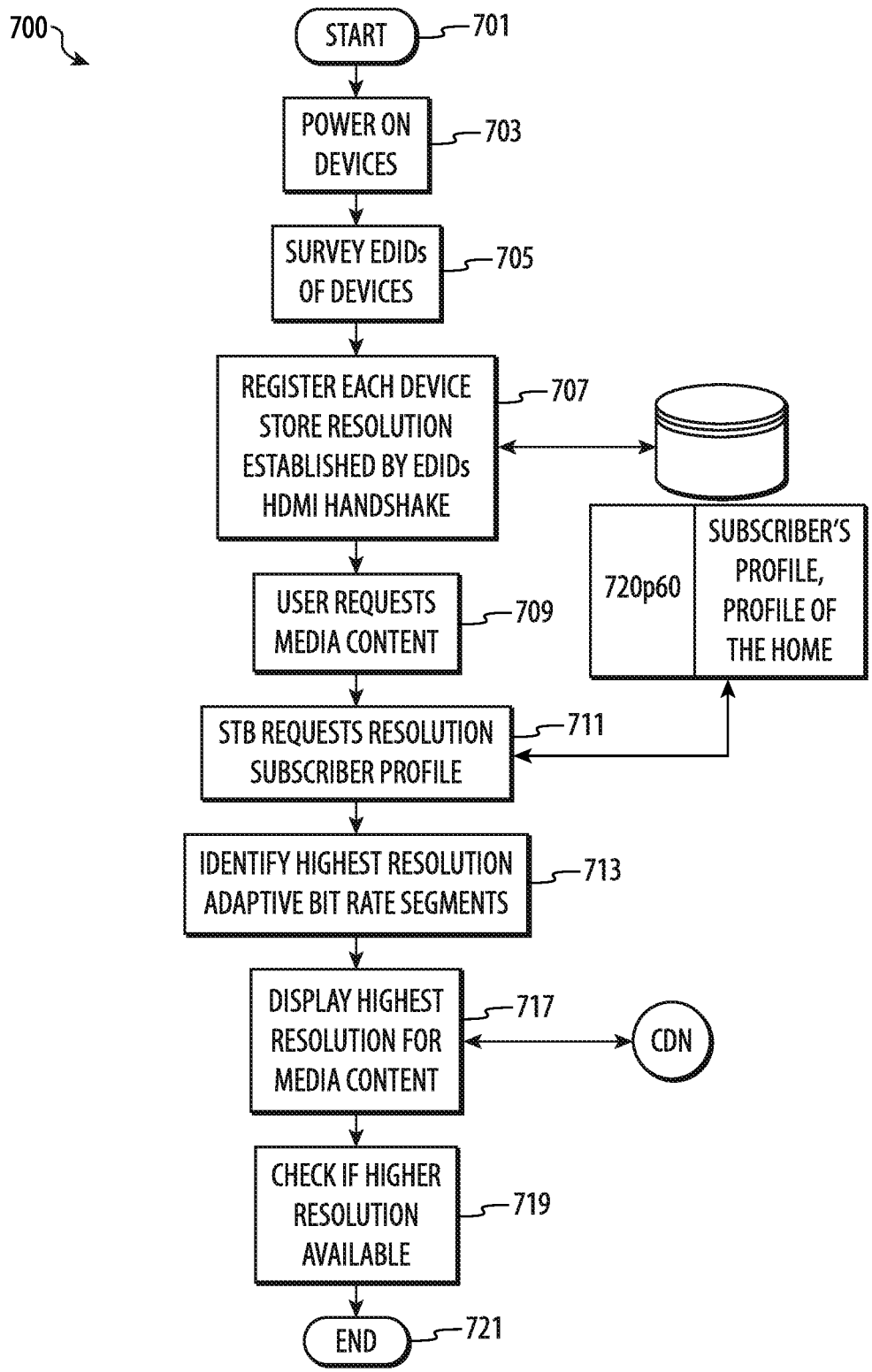
FIG. 7 depicts a process that may be performed by the HDMI adaptive resolution system of FIG. 6.
Figure 8:
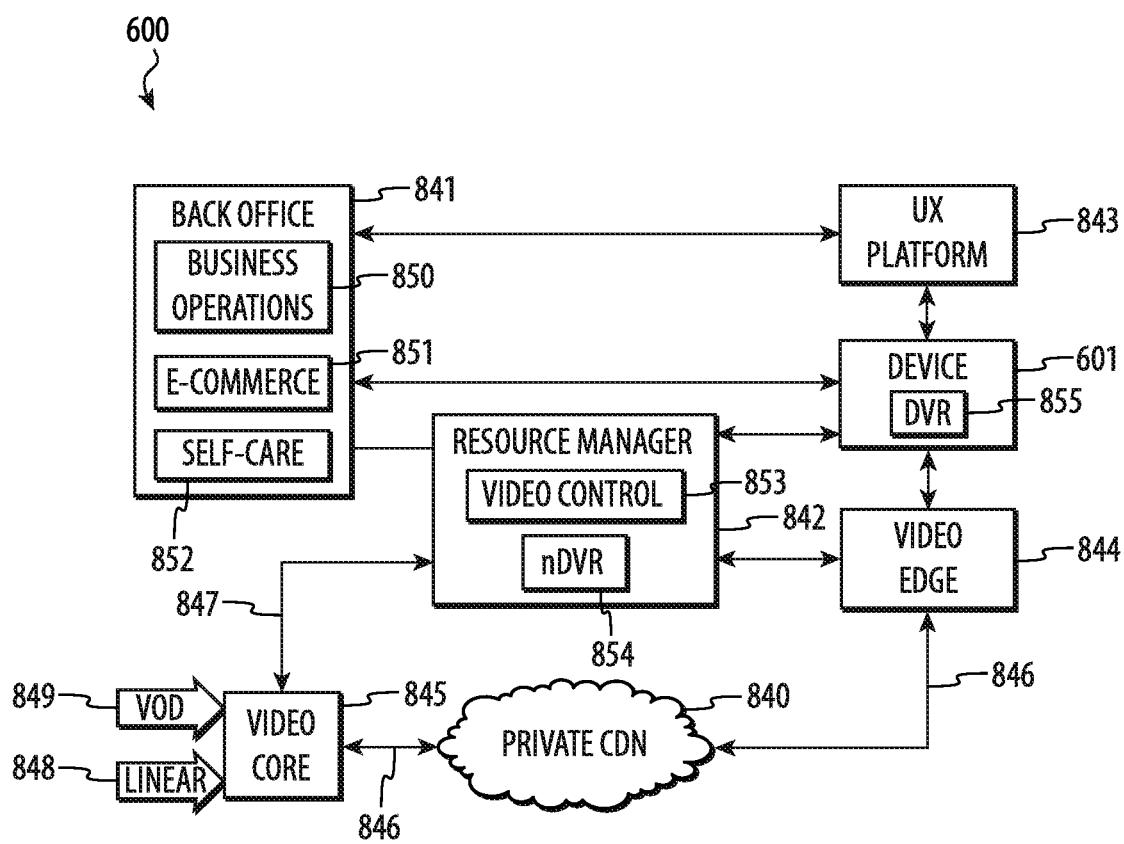
FIG. 8 depicts a block diagram illustrating another aspect of the HDMI adaptive resolution system of FIG. 6.
Figure 9:
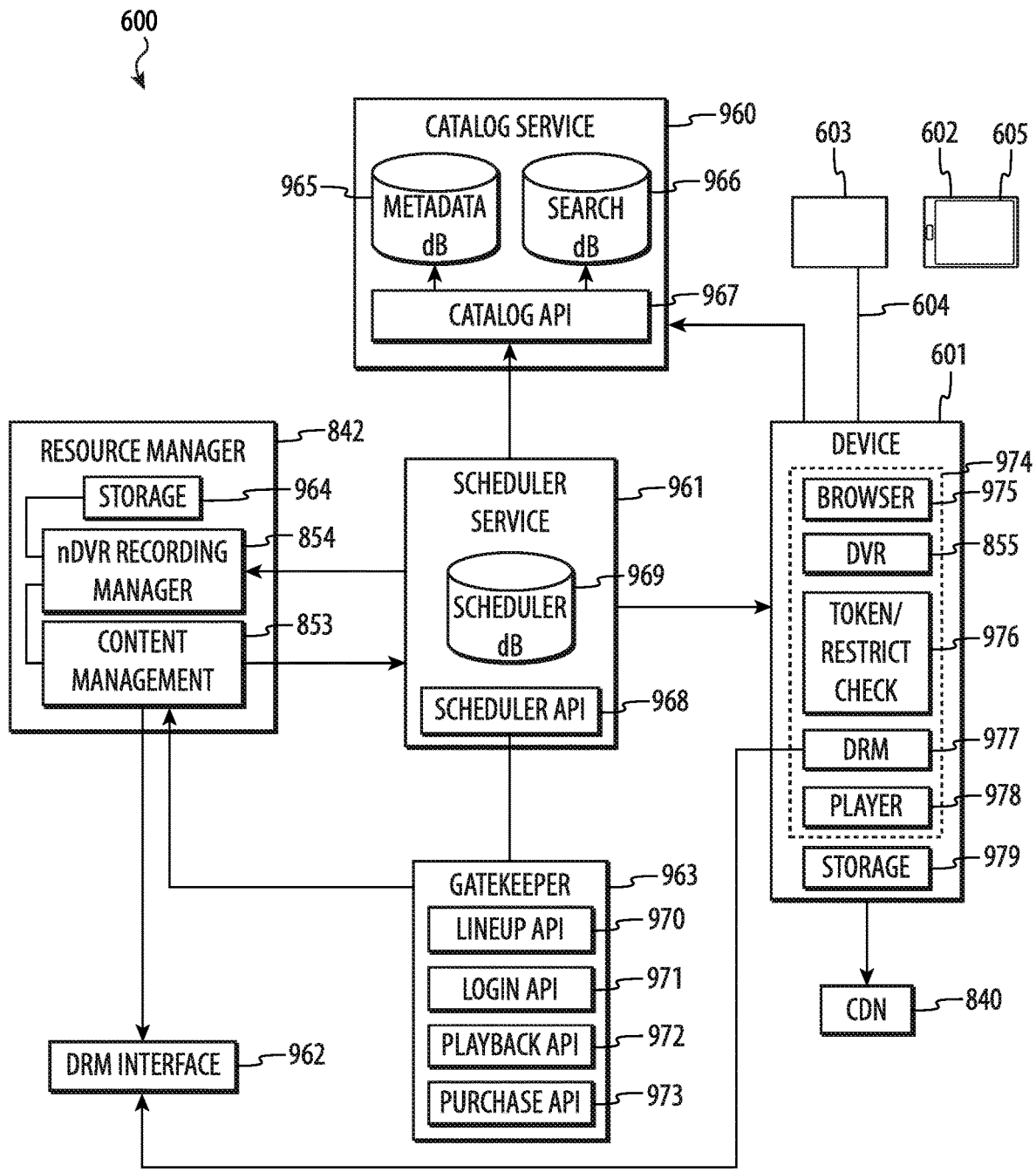
FIG. 9 depicts a block diagram illustrating another aspect of the HDMI adaptive resolution system of FIG. 6.

FIGS. 6-9 illustrate a particular example implementation of the present disclosure. FIGS. 6 and 8-9 depict block diagrams illustrating different aspects of a HDMI adaptive resolution system 600. FIG. 7 depicts a process 700 that may be performed by the HDMI adaptive resolution system 600 of FIGS. 6 and 8-9.

As shown in FIGS. 6 and 7, a process 700 of operating a HDMI adaptive resolution system 600 is provided. As shown in FIGS. 8 and 9, a CDN 840 ingests and distributes content to a user's set top box. The CDN 840 may be configured as described in U.S. patent application Ser. No. 14/765,575 entitled System and Method of Distributing Content Based On Trending and Preemptive Data, which is incorporated by reference in its entirety.

As set forth in more detail herein, a requested piece of content 848, 849 may be broadcast unicast to a set top box 601. The transmission of the linear content 848 or non-linear VOD content 849 may be provided in numerous adaptive bit-rate (ABR) segments that are packaged in multiple resolutions (e.g., 1080p30, 1080i30, 720p60, etc.) and frame speeds according to the H.264, MPEG-4 Part 10, or AVC (Advanced Video Coding) codec. The system 600 may be formed and implemented using a digital video recorder (DVR) integrated device (e.g., a set top box) and/or on a network digital video recorder (nDVR).

In some implementations, when recording TV, video and/or movie content media files, the video core 845 ingests non-linear core 848 and linear content 849 and packages to encode in one or more media content segments for distribution across the CDN 840, for example, using ABR. The media content segments may not be multicast or broadcast to the end client, but may only be retrieved by an active request to pull them (for instance, using HTTP GET request) from the network serving device such as, for example, device 601 using the CDN 840. Information about the ABR segments of media content 848, 849 may be stored in a manifest file. As a result, the resource manager 842 may have multiple resolutions of media content 848, 849 available to pull and send to the subscriber for display (e.g., ULTRA HD 4Kp60 HEVC Video Encoding (H.265), 1080p30, 1080i30, 720p60, etc.). The manifest file may be configured with a subscriber profile so as to list resolutions of all registered devices 601 of the subscriber, whereby the resource manager 842 may utilize the manifest file and a subscriber profile to send ABR segments of the highest resolution available to the subscriber for viewing and displaying on the appropriate device 601.

According to an embodiment of the HDMI adaptive resolution system 600 of the present disclosure, any connected device 601 may be registered for a subscriber. A registration process may update information of the subscriber profile. As is illustrated in FIG. 6, a set top box 601 and monitor 603 may be connected by an HDMI cable 604. The set top box 601 may be configured with EDID instructions 630. Similarly, the monitor 603 may be configured with EDID instructions 631. The EDID instructions 630, 631 are data structures that reside on the device 601 or in a display 603—commonly referred to as "sinks" in HDMI and DisplayPort standards documents—such as an HDTV or a computer monitor. The EDIDs 630, 631 are intended to be read by a "source" device 601 (e.g., set top box, DVD player, PC graphic card) in order to simplify user operation. A "HDMI handshake" occurs when the device 601 with EDID instructions 630 negotiates a connection with EDID instructions 631 of the monitor 603. The HDMI handshake provides a check that the receiver is authorized to receive the transmitted signal before sending the signal data. The HDMI handshake system also is used by digital rights management DMI interface 962 to prevent HDMI-encrypted content from being played on unauthorized device 601 or other devices which have been modified to copy content transmitted across a HDMI connector.

As illustrated in FIG. 7, and with reference to FIGS. 6 and 8-9, a process 700 provides adaptively a real-time selection of screen resolutions available for media content to display to the subscriber. The process 700 may utilize various video codec in the subscriber profile and manifest file as to the ABR segments allowable (i.e. bitrates, resolutions etc.) between the set top box 601 and the monitor 603 to enhance the user's viewing experience. The set top box 601 may have a software application of the process 700 loaded in storage 979 or available from the resource manager 842 (i.e. computer-implement process) to change adaptively between lower and higher resolution for the video playback on the monitor 603. The software application of the process 700 also can change the playback to another display device 602 (e.g., tablet computing device with integrated display 605 or the like) registered on the profile of the user with the CDN 840 other than the monitor 603 that can be termed a "Profile of the Home." The HDMI adaptive resolution system 600 may utilize the process 700 of dynamic input from the setup sequence between the set top box 601 and the monitor 603 utilizing the connection and EDIDs instructions 630, 631 to find highest resolution for the subscriber profile. Once the HDMI handshake occurs, the ABR segments of the media content 848, 849 may be selected to be the maximum highest resolution for a particular requesting device 601, 602 as registered in the subscriber profile and/or Profile of the Home.

Referring to FIG. 7, at 701 the process may start with the device or set top box 601 and the monitor or display 603 connected by the HDMI cable 604. Each of the device 601 and monitor 603 may contain EDID instructions 630, 631, respectively, as to screen resolution.

At 703, the set top box 601 and monitor 603 may be powered up by manual or timed process. Alternatively, EDIDs instructions 630, 631 may find the highest resolution between a "powered" set top box 601 and "not "on" but "board powered/plugged-in" monitor 603 as the EDID chipset (memory (EEPROM) chip programmed by the manufacturer of the monitor or display) may be surveyed to obtain a resolution of the monitor 603 in plugged-in yet powered off condition.

At 705 the set top box 601 may survey the device resolution for a particular device in the subscriber profile. The set top box 601 may request via the EDIDs instructions 630 the highest resolution available of the monitor 603 by way of the EDIDs instructions 631.

At 707, the set top box 601 stores the monitor's 603 resolution capabilities for a particular device in the subscriber profile. For each user established in and under in the subscriber profile, the set top box 601 may also store resolution capabilities for a particular device. The subscriber profile may then have a catalog of the resolutions of all equipment recognized within the subscriber's account as stored by the set top box 601.

At 709, the user may request content 848, 849. A user may make a request for content via the set top box 601 in many ways (e.g., by making a selection from the catalog of available content, surfing the internet, entering a URL, purchasing content, etc.). The subscriber profile associated with the request may then be determined.

At 711, the set top box 601 obtains the appropriate resolution from the subscriber profile from the CDN 840. For example, the data information in the manifest file may include the resolutions for the one or more devices 601 and displays 603 registered and/or recognized in the subscriber profile. The resource manager may be configured to pull from storage on the CDN 840 a highest screen resolution of the one or more ABR segments of the media content requested for transport on demand to the subscriber based on the data information in the manifest file.

At 713, the device 601 obtains the one or more ABR segments of the requested media content 848, 849 from the servers in the CDN 840. The process 700 thus provides an efficient way for the resource manager 842 and device 601 to communicate the screen resolution(s) of the EDID instructions 631 for the display 603 to provide the highest resolution of the requested media content.

The resource manager 842 may be configured to respond adaptively to a subscriber's on-demand requests for linear media content 848 (i.e. live TV, etc.) and non-linear media content 849 (i.e. streaming, VOD, on-demand) by sending information to the device that a higher screen resolution is available from the manifest file stored on the CDN 840 based on the subscriber's profile. The resource manager 842 may transmit the highest screen resolution available due to current network conditions on the CDN 840, e.g., network outages or bandwidth restrictions, may transmit the best available screen resolution at that time. Simply, the resource manager may pull the one or more ABR segments from storage on the CDN 840 in a lower resolution (e.g., if there is congestion in the network, bandwidth, etc.) then the highest resolution in the subscriber's profile for the particular device 601. Similarly, if the subscriber changes to another one of the devices 601 registered in the subscriber's profile, a lower resolution may be provided e.g., if the user switches to viewing the media content 848, 849 on another device, for example, a smaller screen or the like. In this way, the resource manager 842 may be configured to manage network resources when bandwidth restrictions will not allow for the transmission of the highest bandwidth resolution. When conditions improve, the resource manager 842 may be configured to send an update to the set top box 601 that bandwidth and/or network resources have improved and that it may transmit a higher screen resolution ABR segments available from EDID instructions 631 information for the display 603.

At 717, the content may be presented to the user. At 719, the process 700 may check to see if there is other available resolution for the media content 848, 849. The 719 check in process 700 may allow the resource manager 842 to provide adaptively higher and/or lower resolutions from the available resolutions of requested media content 848, 849 as these may become available in the CDN 840. As detailed herein, if the process 700 determines a higher available resolution can be played back on the user's monitor or device for the requested media content 848, 849, or if higher resolutions become available based on varying factors, the resource manager 842 may pull and transmit higher screen resolution media content 848 849 to the device 601 based on the subscriber profile including for example, the data information of the manifest file, the EDID instructions 631 for the display 603.

For example, if the processor is bogging down and can't play video fast enough, the user profile the user is active in may be determined to dynamically adjust the user profile based on the performance to (1) lower resolution if getting bogged down with a slight degradation of the stream or (2) higher resolution if network resources improve or if initially available and the set top box is set to, for example, 720p 60 and 1080p 30 is available. Here, the process 700 may select files at the higher optimum resolution for the playback of the requested media content 848, 849 for streaming to the subscriber on-demand in 705. In this manner, the subscriber profile may be utilized to provide streams of the best resolution for the device on-demand (live, linear TV, local TV, etc.) as well as changing the resolution of the playback of the video stream adaptively and in real-time, quickly and transparently to the device and/or set top box 601.

The request for information from the monitor 603 or other device via the HDMI handshake can be performed at the installation of the subscriber profile, a new user account being established for a subscriber using the back office system 841, at the "power up" condition between the device or set top box 601 and monitor 603, at any other time, and so on.

At 721, the process 700 may end.

Accordingly, process 700 may conserve resources of the CDN 840 system such as, for example, bandwidth may be conserved, e.g., transferring a 4Kp60 file across the CDN 840 to the device 601 when the display 603 cannot utilize or display such screen resolution. This may also allow the set top box 601 to make only one request to the resource manager for maximizing the resolution based on the subscriber profile, whereby each request identifies the one or more devices registered to the subscriber profile and their screen resolution so as to transmit known screen resolutions to known devices, thereby optimizing the bandwidth and load on the CDN 840. In this example, the resource manager 842 may have information in the subscriber profile associating a maximum or highest resolution to the one or more registered devices 601. The resource manager 842 having information on screen resolution also means the CDN 840 may optimize the viewing of the subscriber by pulling and transmitting the one or more ABR segments in a highest resolution associated with the one or more devices in the subscriber profile.

When the device 601 is a set top box, the HDMI cable 604 may perform the HDMI handshake between the set top box 601 and the display 603 in the manner described herein even when the display is not in a powered-up condition. This may be more flexible than requiring power on.

The subscriber profile and the EDID 630, 631 of the device 601, 602 and related display 603 may provide information during account set up to register a device with a back office 841. The resource manager 842 may utilize the information provided in the account set-up at the back office 841 to populate the data of the subscriber profile. This may provide resolution information at the set-up stage without requiring that the HDMI handshake be performed repeatedly, or each time the device is powered up.

Thus, the above may enable a system 600 that may provide one or more ABR segments in the highest resolution for the device for a subscriber on-demand. The system 600 may allow adaptive and dynamic real-time changing of the resolution associated with the one or more ABR segments being pulled by the resource manager 842 for transmission to the set top box 601. The subscriber profile, among other information, may store information about the number of users associated with the subscriber, and (2) the equipment type and screen resolution of all users associated with the subscriber profile.

In some embodiments, the manifest file may be configured to store data and file information on the screen resolution of the one or more ABR segments stored in the CDN 840. While the manifest file is used in the process 700, it may track each of the numerous ABR segments created upon ingesting, packaging and storing broadcast content in the one or more ABR segments for associated media content 848, 849. Moreover, each monitor 603, 605 of the one or more devices 601, 602 that may be registered by and under the subscriber profile may have a distinct profile and limitations. As a result, it may be impractical to create a user profile in the manifest file for each display 603 and/or the one or more registered devices 601 registered to the subscriber's account. Utilizing the HDMI handshake of 707 may resolve these issues. For example, the manifest file may be used to store information for different devices 601 available in the marketplace rather than storing each in separate user profiles. As a result, the system 600 may provide the highest and/or best resolution for a particular device 601, 602 and its associated display 603, 605 by utilizing the subscriber's profile and other information contained, for example, in the manifest file and the EDID instructions 631, so as to adaptively change the resolution of the playback of the media content 848, 849 adaptively and in real-time.

Referring to FIGS. 8 and 9, the system 600 may be configured with a video core 845 adapted for content processing and communication for ingesting and packaging linear content 848 (e.g., live broadcasting) and non-linear 849 content (e.g., video on demand (VOD)) by communication lines 846 across a communication network or content delivery network (CDN) 840 to the video edge 844 to service a device 601 (e.g., set top box, tablet, smart phone, computer, etc.) of a user that subscribes to a content subscription service. The video core 845 may also communicate with a resource manager 842 over communication lines 847 to provide information about the ingested and packaged linear content 848 and non-linear content 849 such as, for example, by maintaining a manifest file. The manifest file may identify and store broadcast media content 848, 849 information and/or metadata in the manifest file for the desired media content. For example, the manifest file may capture persistence and digital rights policy for the media content in the CDN 840. The manifest file further may store metadata information to identify the media content 848, 849.

The manifest file and/or HLS header may be used to provide the information persistence and digital rights policy for use by the resource manager 842 and back office 841 with such information stored with the media content 848, 849 in network storage 964. The system 600 may also include a back office 841 with business operations 850 (e.g., regulations, licenses, etc.), e-commerce 851 (e.g., subscriber billing, payments, etc.) and a self-care 852 portal (e.g., updates, remote servicing of devices, etc.). The user experience platform 843 may be a multi-dimensional platform to present content media to the user in a predetermined graphical user interface (GUI). A digital rights management (DRM) interface 962 may be adapted to interface with the user device 601.

The resource manager 842 may be responsible for a persistence and digital rights policy along with allocating, monitoring, and controlling resources, particularly pulling ABR segments and bandwidth therefor, for recording and playback related services. The resource manager 842 may utilize token management 976 to authorize viewing of copyrighted content according to policies and rights management across the CDN 840. The resource manager 842 in conjunction with the DRM interface 962 may authorize a particular device 601 utilizing the token restriction check 976. The resource manager 842 also may check persistence and digital rights policy using the gatekeeper 963.

According to an embodiment, the system 600 may be configured to transmit and store the content media segments and file information using HLS protocol and ABR technologies over for distribution across the CDN 840. In this manner, the system 600 may be formed to use HLS for the file information of the segments of media content pre-timing advantages of ABR by dynamically monitoring CPU and memory capacity to make corresponding adjustments in the video quality of the transmitted content media by encoding the source linear and non-linear content (e.g., live broadcast, movie, video, etc.) at varying bit rates, and then segmenting each of the different bit rate streams. The segment length may be a predetermined size and duration, for example, between 2 and 10 seconds. The device 601 may include a player 978 to use the ABR advantageously to switch among the different bit rate segments, thereby locating the segments that correspond best to the bandwidth. In this manner, the system 600 may make use of improved CDN efficiencies using technologies such as ABR, fragmented MPEG-4 files or other formats that can typically be delivered via download technology so as to utilize the HTTP information file or file header to provide information and/or metadata regarding the media content 848, 849 for later reference by the user.

The resource manager 842 may be responsible for allocating, monitoring, and controlling resources, particularly pulling ABR segments and bandwidth therefor, for recording and playback related services. The resource manager 842 may integrate a network DVR (nDVR) 854 for the recording and/or playback of linear 848 and non-linear 849 content by video control 853. According to a DVR embodiment, the device 601 may integrate a DVR recorder 855 for the recording and/or playback of linear 848 and non-linear 849 content in storage on the device. It is to be appreciated that the a desired ABR segment of media content 848, 849 may be pulled from storage on CDN 840 and supplied or otherwise communicated to the nDVR 854 resource in the cloud and DVR 855 on the device 601 for the user.

According to an embodiment, the system 600 may be configured to transfer information in the segments or in one or more multiple bit rate segments and file information of the content media files (e.g., media segments representing frames of video or other programming) by way of HLS to transfer and deliver across the CDN 840 from the video core 845 to the video edge 844 closest to the client device 601. The system 600 can be configured to use ABR technologies to identify persistence and rights management policies, file information and other use policies for the subscriber associated with the transmitted content media files using HLS or other HTTP protocols for distribution across the communications network, for example, a private CDN 840.

The system 600 may be configured to provide persistence and digital rights policy for the media content 848, 849 in situations when a user decides to store for later viewing independent of location, or use the DVR 855 or nDVR 854, to record a desired scheduled broadcast media content 848, 849, and to then view or otherwise display the media content 848, 849 at a later time independent of the location, i.e. outside of the home. As illustrated, according to an embodiment of the invention, the video core 845 may be configured to ingest, segment and package the input linear 848 and non-linear 849 media content into ABR segments for later pulling ABR segments across CDN 840 to the video edge 844 for accessing by the user's device 601. A catalog of file information, metadata and other information about the content 848, 849 may be written into a manifest file that is stored on a resource manager 842 for video control 853. When the user accesses the content media file(s) 848, 849, the user's device 601 may request the segments from the CDN by an address given in the manifest file. The resource manager 842 may control pulling of ABR segments of content media file(s) 848, 849 to the user's device for playback and display.

The system 600 may use the advantages of ABR by dynamically monitoring CPU and memory capacity to make corresponding adjustments in the video quality of the transmitted content media by encoding the source linear and non-linear content (e.g., live broadcast, movie, video, etc.) at varying bit rates, and then segmenting each of the different bit rate segments. The media segment length may be a predetermined size and duration, for example, between 2 and 10 seconds. The device 601 may include a player 978 (as shown in FIG. 9) to use the ABR advantageously to switch among the different bit rate segments, thereby locating the segments that correspond best to the bandwidth. The player 978 in the device 601 may be configured to play the linear and non-linear content media file(s) 848, 849 to create an optimum user experience.

In some embodiments, the device 601 may have application software 974 loaded in memory of the device 601, e.g., a set top box or satellite DVR receiver. In establishing a recording, the device 601 may check with the gatekeeper 963 to determine the user's privileges, the user's metadata, the lineup data, perform a restrictions check, such as passing an authorization token, and also may purchase media content. The application software 974 may be configured as application programming interfaces (API). The application software 974 may be configured with a browser 975, a digital video recorder (DVR) 855, authorization token or restriction checker 976, a digital rights management (DRM) module 977, and content media player 978. The application software 974 may be adapted to log in to a gatekeeper 963 module of the resource manager 842. The gatekeeper 963 may also utilize APIs for various subscriber data services for policies of acquisition, persistence, and consumption for the media content that may be established by the back office 841. The gatekeeper 963 may be used in recording linear 848 and non-linear 849 media content including a lineup API 970, login API 971, playback API 972 and purchase API 973. The digital recording functionality may be configured to pull ABR segments by assembling media segments to create a temporal viewing experience (such as time shifting) by reassembling the segments into the original order of the content program being viewed at an alternate time from the original airdate of the program. Any pulled media segments may be delivered to the device 601 by resource manager 842 making an active request to retrieve those segments from the CDN.

The scheduler service 961 may be implemented in the system 600 as a scheduler API 968 and a scheduler dB 969. The scheduler service 961 may be utilized to operate in connection with the resource manager 842 to create program schedule information, whereby the scheduler service 961 may be configured to provide a catalog of media content data to display to the user at a predetermined time by the user communicating a selection to the resource manager 842. The scheduler service 961 may be configured to communicate with the resource manager 842, the device 601 of the user, a gatekeeper 963 for effectuating policies associated with the user and/or user's subscription, and a catalog service 960. The user may utilize the scheduler service 961 to specify channels to view from the guide or line-up display, user privileges, and other settings (e.g., such as DVR settings and preferences default DVR scheduling settings. The scheduler service 961 may check with the gatekeeper 963 for authentication, entitlement check, and other account data for the particular user. The catalog service 960 may provide metadata information about the media content that is stored in a metadata database 965 and may provide search capabilities using a search database 966. The catalog service 960 may be implemented in a software program or catalog API 967. Scheduling of the recording of the media segments may occur either in the local host or the cloud/server side program scheduler.

The digital recording functionality of pulling ABR segments may be utilized to reduce system overhead in the delivery to the device of the subscriber or user. Moreover, such resources that may be utilized for other functions such as, for example, forming multiple ABR segments of the highest resolution on the ingestion of high bit rate video. According to an embodiment, the system 600 may be configured to transfer HLS segments of media content in an ABR manner across the CDN 840 from the video core 845 to the video edge 844 closest to the client device 601. In a movie, video or broadcast, frames and/or file information of the content media data may be stored in a manifest file. Frames and/or file information of the content media data may occur in a predetermined order based on time.

In various particular example embodiments, a system for determining the best resolution for media content displayed to a subscriber may include: a content delivery network (CDN) configured to ingest the media content from a broadcast stream, the CDN adapted to encode the media content in one or more ABR segments varying formats, the CDN further adapted to create a manifest file containing profiles and attributes of the media content so as to associate data information for each of the one or more ABR segments, the CDN configured to pull and HLS transport the manifest file and each of the one or more ABR segments on demand to the subscriber; a resource manager for controlling service requests for the media content in the CDN, the resource manager identifying the manifest file, the resource manager further configured to create a subscriber profile; High Definition Multimedia Interface (HDMI) cable between the device and a display for viewing the one or more ABR segments requested by the subscriber on demand; and a device configured to use the HDMI cable, the device further including an Extended Display Identification Data (EDID) file stored for the device so as to identify a predetermined screen resolution of a display of the particular device. The resource manager may be configured to pull a highest screen resolution of the one or more ABR segments from storage on the CDN to transport on demand to the subscriber based on the data information in the manifest file.

In some examples, the data information in the manifest file includes screen resolution associating each of the one or more ABR segments with the screen resolution. In various examples, the device is a set top box.

In numerous examples, the set top box identifies a screen resolution of the display using the HDMI cable to read the EDID file for the screen resolution of the display, the set top box communicates the screen resolution of the display to the resource manager, whereby the resource manager pulls a highest screen resolution of the one or more ABR segments from the data information in the manifest file associated to each of the one or more ABR segments, and the resource manager pulls from storage on the CDN the one or more ABR segments to transport on demand to the subscriber for each of the one or more devices. In various examples, the resource manager communicates to the set top box of a higher screen resolution available for the one or more ABR segments, the set top box identifies that the higher screen resolution is in the EDID file for the display, and the resource manager pulls the one or more ABR segments of the higher screen resolution from storage on the CDN to transport on demand to the subscriber. In some examples, the resource manager is configured to create a subscriber profile registering one or more devices of the subscriber, whereby the resource manager uses the subscriber profile file for pulling the one or more ABR segments from storage on the CDN to transport on demand to the subscriber for each of the one or more devices of the subscriber registered with the resource manager.

In some particular example embodiments, a method for determining the best resolution for media content displayed to a subscriber includes determining a screen resolution of a display utilizing EDID file; registering of one or more devices of the subscriber to a subscriber profile; storing the screen resolution of the display associated with a particular device of the one or more devices registered in the subscriber profile in storage in a CDN accessible by a resource manager; receiving a request for media content from the subscriber; selecting a highest screen resolution for the particular device from information in the subscriber profile; identifying one or more ABR rate segments corresponding to the highest screen resolution for the particular device for the requested media content from a manifest file stored in the CDN; and transmitting the one or more ABR rate segments for the highest screen resolution for the particular device.

In various particular example embodiments, a set top box device, system, and process uses a HDMI cable as well as the HDMI handshake and EDID(s) to provide adaptively real-time selection of screen resolutions available for media content to display to a subscriber. A device may be registered with a resource manager configured to use the HDMI handshake to read the EDID file stored for the registered device so as to identify a predetermined screen resolution of a display of the particular device and the resource manager may be configured to pull a highest screen resolution of one or more ABR segments from storage on the CDN to transport on demand to the subscriber.

In some examples, the resource manager may be configured to create a subscriber profile to register one or more devices of the subscriber. The resource manager may use the subscriber profile file for pulling one or more ABR segments from storage on the CDN to transport on demand to the subscriber for a particular screen resolution associated with the one or more devices of the subscriber registered with the resource manager.

As described above and illustrated in the accompanying figures, the present disclosure relates to adaptively selecting content resolution. A content provider device may receive a request for content and obtain resolution information for a device associated with the request from a profile. Based at least on the obtained resolution information, the content provider device may select among available resolution versions of the content. The content provider device then provides access to the selected version of the content.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device for adaptively selecting content resolution, comprising:
  a non-transitory storage medium; and
  a processing unit that executes instructions stored in the non-transitory storage medium to:
  receive a request for content;
  obtain resolution information from a user profile that corresponds to a device associated with the request;
  select a version of the content from available versions that has a highest resolution enabled by a current network condition and is within constraints indicated in the resolution information; and
  provide access to the version of the content; wherein the resolution information is derived by:
    obtaining an identifier for the device; and
    querying a database that stores known resolutions for different devices to correlate the identifier to a known resolution, the database not including an entry for the device.

2. The electronic device of claim 1, wherein the processing unit:
  determines an additional version of the content has a higher resolution enabled by the current network condition and is within the constraints indicated in the resolution information;
  ceases providing access to the version of the content; and
  provides access to the additional version of the content.

3. The electronic device of claim 1, wherein the processing unit:
  determines the version of the content is no longer enabled by the current network condition;
  determines an additional version of the content that is enabled by the current network condition and is within the constraints indicated in the resolution information;
  ceases providing access to the version of the content; and
  provides access to the additional version of the content.

4. The electronic device of claim 1, wherein the processing unit monitors the current network condition for changes.

5. The electronic device of claim 1, wherein the user profile is unique to a particular user.

6. The electronic device of claim 1, wherein the device comprises a presentation device associated with a content access device that provided the request for the content.

7. The electronic device of claim 6, wherein the content access device is operable to automatically switch between different versions of the content when the different versions of the content are provided by the processing unit.

8. An electronic device for adaptively selecting content resolution, comprising:
  a non-transitory storage medium; and
  a processing unit that executes instructions stored in the non-transitory storage medium to:
  receive a content request for a device;
  obtain resolution information for the device from a registration file;
  select a content resolution based on the resolution information; and
  provide access to a version of content having the content resolution; wherein the resolution information is derived by:
    obtaining an identifier for the device; and
    querying a database that stores known resolutions for different devices to correlate the identifier to a known resolution, the database not including an entry for the device.

9. The electronic device of claim 8, wherein the processing unit stores the resolution information in the registration file upon receipt during a registration process.

10. The electronic device of claim 9, wherein the processing unit receives the identifier for the device along with the resolution information.

11. The electronic device of claim 9, wherein the registration file includes additional resolution information for another device that is derived from a High Definition Multimedia Interface handshake.

12. The electronic device of claim 9, wherein the registration file includes additional resolution information for an additional device that is derived from Extended Display Identification Data stored by the additional device.

13. The electronic device of claim 8, wherein the device is operable to automatically switch between different versions of the content when the different versions of the content are provided by the processing unit.

14. The electronic device of claim 8, wherein the registration file is shared between users of a content provider device service.

15. An electronic device for adaptively selecting content resolution, comprising:
- a non-transitory storage medium; and
- a processing unit that executes instructions stored in the non-transitory storage medium to:
- obtain resolution information from a user profile that corresponds to a device associated with a content request; and
- select a version of content to which to provide access that has a resolution in accordance with the resolution information; wherein the resolution information is derived by:
  - obtaining an identifier for the device; and
  - querying a database that stores known resolutions for different devices to correlate the identifier to a known resolution, the database not including an entry for the device.

16. The electronic device of claim 15, wherein the non-transitory storage medium stores an additional version of the content that has a higher resolution than the version of the content and is incompatible with the device.

17. The electronic device of claim 15, wherein the processing unit stores the resolution information in the user profile during a registration process.

18. The electronic device of claim 15, wherein the device is a content access device that submitted the content request.

19. The electronic device of claim 15, wherein the device comprises a television upon which a set top box that submitted the content request is operable to display content.

20. The electronic device of claim 15, wherein the processing unit receives the content request from the device.

\* \* \* \* \*